United States Patent [19]
Anderson

[11] Patent Number: 5,373,935
[45] Date of Patent: Dec. 20, 1994

[54] RETURN ROLLER ASSEMBLY FOR A BULK CONVEYOR

[76] Inventor: Ronald G. Anderson, 5226 Limaburg Rd., Burlington, Ky. 41005

[21] Appl. No.: 62,996

[22] Filed: May 17, 1993

[51] Int. Cl.⁵ .............................................. B65G 39/16
[52] U.S. Cl. ................... 198/808; 198/830; 198/842
[58] Field of Search ............... 198/842, 830, 828, 824, 198/825, 808

[56] References Cited

U.S. PATENT DOCUMENTS

| | | | |
|---|---|---|---|
| 1,486,259 | 3/1924 | Nelson | 198/808 |
| 1,501,721 | 7/1924 | Peterson | 198/824 |
| 1,773,621 | 8/1930 | Hopkinson | 198/825 X |
| 1,963,099 | 6/1934 | Robins | 198/808 |
| 2,109,925 | 3/1938 | Mitchell | 198/808 |
| 2,128,309 | 8/1938 | Madeira . | |
| 2,179,187 | 11/1939 | Kendall . | |
| 2,195,159 | 3/1940 | Wood . | |
| 2,387,977 | 10/1945 | Blackie . | |
| 2,662,447 | 12/1952 | Murphy . | |
| 2,688,394 | 9/1954 | Hurd et al. . | |
| 2,818,966 | 1/1958 | Gill | 198/842 X |
| 2,921,669 | 1/1960 | Bainbridge | 198/842 X |
| 3,105,588 | 10/1963 | Long | 198/842 |
| 3,174,619 | 3/1965 | Krane | 198/842 |
| 3,199,661 | 8/1965 | Smith | 198/828 |
| 3,212,626 | 10/1965 | McLeish et al. | 198/842 |
| 3,647,049 | 3/1972 | Hartzell, Jr. | 198/830 X |
| 4,024,949 | 5/1977 | Kleysteuber et al. . | |
| 4,049,328 | 9/1977 | Ouska et al. . | |
| 4,363,399 | 12/1982 | Ludwig et al. . | |
| 4,475,648 | 10/1984 | Weeks | 198/830 |
| 4,732,267 | 3/1988 | Schober . | |
| 4,760,913 | 8/1988 | Tschantz | 198/842 X |
| 5,161,675 | 11/1992 | Engst et al. . | |

FOREIGN PATENT DOCUMENTS

| | | | |
|---|---|---|---|
| 0022810 | 2/1984 | Japan | 198/830 |
| 788374 | 1/1958 | United Kingdom | 198/830 |

Primary Examiner—D. Glenn Dayoan
Attorney, Agent, or Firm—Frost & Jacobs

[57] ABSTRACT

A return roller assembly for the return flight of a continuous belt of a bulk conveyor, the return roller assembly having a center roller and a pair of end rollers, the center roller being mounted horizontally and the end rollers being mounted such that the upper most portion of the inner ends are at the same vertical level as the uppermost part of the center roller and the uppermost part of the outer ends of the end rollers are below the vertical level, the center and end rollers defining a shallow, inverted, trough-like supporting shape for the return flight.

14 Claims, 3 Drawing Sheets

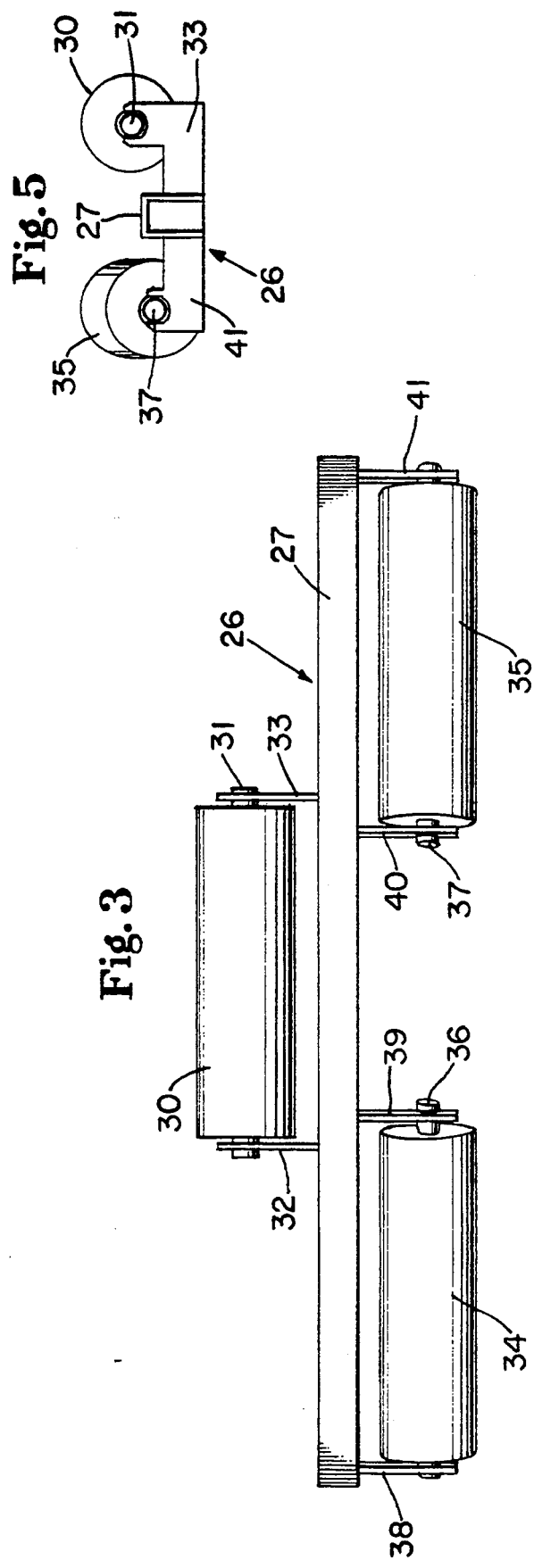
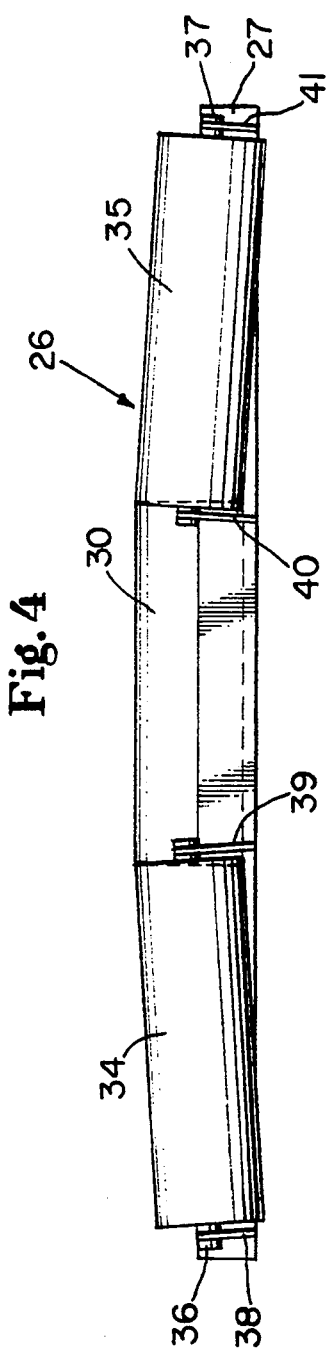

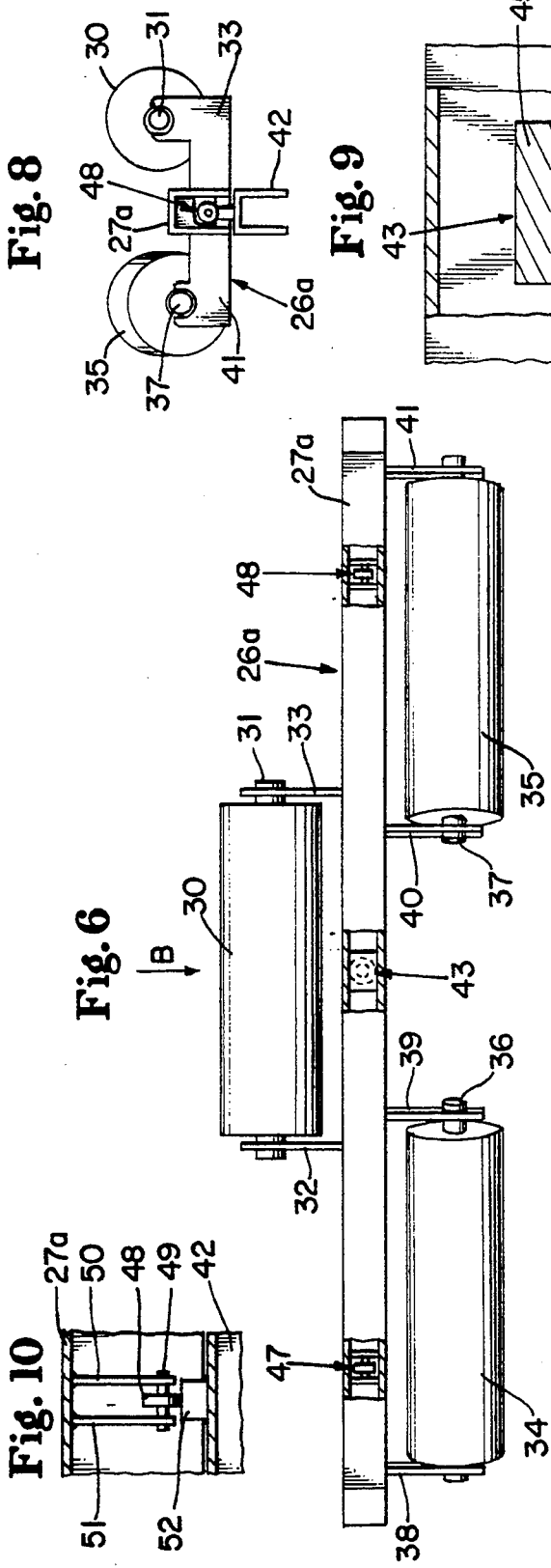

RETURN ROLLER ASSEMBLY FOR A BULK CONVEYOR

TECHNICAL FIELD

The invention relates to a return roller assembly for the return flight of the continuous conveyor belt of a bulk conveyor, and more particularly to such an assembly comprising three rollers arranged to define a supporting shape accommodating the shallow, inverted, trough-shaped set of the return flight.

BACKGROUND ART

While not necessarily so limited, the present invention is particularly applicable to heavy duty bulk conveyors of the type used to transport gravel, aggregate, coal and the like. Such conveyors can be of any length, and in some applications can extend several miles. The bulk conveyor is provided with a continuous belt which can travel at speeds of from about 300 to about 1100 feet per minute. Bulk conveyors of the type just described are well-known in the art. Generally, the bulk conveyor comprises a roller supporting framework having side members and appropriate transverse bracing. The roller supporting framework is, itself, normally supported at a convenient height by legs depending downwardly from the framework side members. Alternatively, the framework could be suspended from an appropriate overhead structure. The upper flight of the continuous belt is supported at appropriate intervals by troughing roller assemblies so configured and arranged as to impart to the upper flight a transverse, trough-like cross section. The lower flight of the continuous belt is normally supported at appropriate intervals by single rollers extending transversely across the framework.

The present invention is directed to improved support for the return flight of the continuous conveyor belt. Prior art single, transverse, support rollers for the return flight are characterized by a number of problems. At times, problems are encountered with the belt not tracking properly, resulting in damage to the return rollers, the framework, and the belt. The relatively long return rollers are shaft mounted, and are subject to shaft deflection resulting in reduced bearing life. Finally, it has been found that the troughing rollers supporting the upper flight and imparting a trough-like cross section to the upper flight, actually tend to impart a shallow, trough-like, transverse "set" to the belt so that the lower flight is characterized by an inverted, shallow, trough-like transverse cross-section. As a result, the longitudinal edges of the belt tend to cut into the return rollers markedly shortening the roller life and damaging the belt edges.

The present invention is based upon the discovery that the above-noted problems in association with the return flight can be overcome by substituting for each single return roller an assembly of three shorter rollers arranged to define a supporting shape accommodating the shallow, inverted, trough-like set of the return flight. Guidance of the belt and tracking of the belt are markedly improved. Shaft deflection characteristic of long rolls is eliminated. Furthermore, in the new assembly, six bearings carry the same load as was carried by two bearings when the long single roll was used. Both of these advantages greatly lengthen the bearing life. Roll cutting by the conveyor belt longitudinal edges is eliminated. In some instances, the entire return roll assembly may be rotatively mounted at its vertical centerline for very limited pivotal movement, as will be described hereinafter. This slight pivotal movement will tend to cause the return flight to be self-centering.

DISCLOSURE OF THE INVENTION

According to the invention there is provided a return roller assembly for the return flight of the continuous belt of a bulk conveyor. A number of such return roller assemblies are located at appropriate intervals along the conveyor to support the entire return flight of the conveyor belt. The return roller assembly comprises a center roller and a pair of end rollers. The central roller and the end rollers are each rotatively mounted on its own shaft which extends transversely of the conveyor and the return flight of the conveyor belt. The center roller is mounted horizontally. The end rollers are mounted behind the center roller with their shafts aligned and in parallel spaced relationship to the shaft of the center roller. Each of the end rollers slopes downwardly and outwardly. Each of the end rollers has an inner end vertically aligned with an end of the center roller, and an outer end at the lower level.

The central and end rollers of the return roller assembly define a supporting shape for the return flight of the conveyor belt. This supporting shape accommodates the shallow, inverted, trough-shaped set of the return flight.

The return roller assembly may be mounted for slight pivotal movement about the vertical centerline of the assembly. This slight pivotal movement tends to automatically maintain the return flight of the conveyor belt centered with respect to the conveyor.

BRIEF DESCRIPTION OF THE DRAWINGS

FIG. 3 is a plan view of the return roller assembly of the present invention.

FIG. 4 is an elevational view as seen from the bottom of FIG. 3.

FIG. 5 is an end elevational view as seen from the right side of FIG. 3.

FIG. 6 is a fragmentary plan view, similar to FIG. 3, illustrating another embodiment of the present invention.

FIG. 7 is a fragmentary elevational view as seen from the bottom of FIG. 6.

FIG. 8 is an end elevational view as seen from the right of FIG. 6.

FIG. 9 is a fragmentary elevational view, partly in cross section, of the central pivot assembly of FIGS. 6 and 7.

FIG. 10 is a fragmentary elevational view, partly in cross section, of one of the support rollers of FIG. 6.

DETAILED DESCRIPTION OF THE INVENTION

Figure 1:
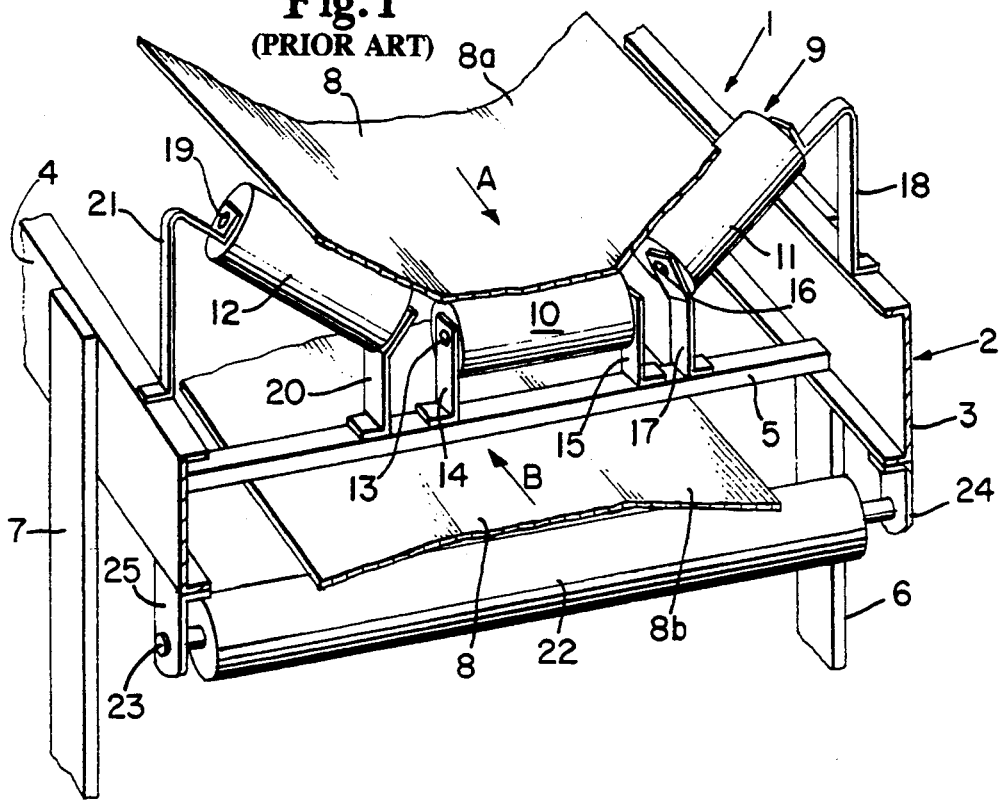
FIG. 1 is a fragmentary perspective view illustrating a conventional prior art bulk conveyor.

Reference is first made to FIG. 1 wherein an exemplary prior an bulk conveyor is fragmentarily illustrated. The conveyor is generally indicated at 1 and comprises a framework generally indicated at 2. The framework comprises side members 3 and 4 which extend the length of the conveyor. The side members 3 and 4 are joined together by appropriate transverse braces, one of which is illustrated at 5. The framework 2 is located at a convenient height by a plurality of legs affixed to side members 3 and 4. Two such legs are shown at 6 and 7.

The conveyor 1 is provided with a continuous belt 8. The belt has an upper flight 8a and a lower flight 8b. At appropriate intervals along the length of the conveyor, the upper flight 8a of conveyor belt 8 is supported by an assembly of troughing rollers. The troughing roller assembly is generally indicated at 9 and comprises a center roller 10 and end rollers 11 and 12. The rollers 10, 11 and 12 are idler rollers, each rotatively mounted on its own shaft and provided with appropriate bearing means (now shown). The shaft 13 of roller 10 is supported by a pair of brackets 14 and 15 mounted on the transverse brace 5. It will be noted that the roller 10 and its shaft 13 are horizontal. The roller 11 is aligned with the roller 10, but its shaft 16 slopes upwardly and outwardly from roller 10, being supported by a bracket 17 mounted on transverse brace 5 and a bracket 18 affixed to side member 3. In a similar fashion, the roller 12 is aligned with the roller 10 and its shaft 19 extends upwardly and outwardly from roller 10, being supported by a bracket 20 affixed to transverse brace 5 and a bracket 21 affixed to side member 4.

It will be immediately apparent that the orientation of rollers 10, 11 and 12 impart a trough-like transverse configuration to the upper flight 8a of conveyor belt 8. This, of course, enables the upper flight to more easily transport material such as aggregate, gravel, coal or the like. The rollers 11 and 12 slope upwardly and outwardly with respect to the horizontal and the angularity of this upward and outward slope may vary, depending upon the material being conveyed, the nature of the belt, the speed of the belt and the like. Normally, the angularity of rollers 11 and 12 to the horizontal will fall within the range of from about 27° to about 45°.

The lower flight 8b of the conveyor belt 8 is supported at appropriate intervals along the conveyor 1 by a plurality of single rollers, one of which is shown in FIG. 1 at 22. The roller 22 is rotatively mounted on a shaft 23 and is provided with appropriate bearings (not shown). The ends of the shaft 23 are supported by brackets 24 and 25 which depend downwardly from side members 3 and 4, respectively.

The prior art structure described with respect to FIG. 1 functions well and properly, but is characterized by problems relating to the roller 22. First of all, since the roller is of a length sufficient to extend across the conveyor 1, it is subject to shaft deflection common to long rollers. This, in turn, means shorter bearing life. Furthermore, the weight of the return flight is supported by the two bearings (not shown) located within the ends of the roller 22.

It has been found that the assemblies of troughing rollers 10, 11 and 12 impart to the belt 8 a permanent, shallow, inverted, trough-shaped "set" which is clearly shown in FIG. 1 with respect to the bottom flight 8b. As a consequence, the return flight 8b is primarily supported along its longitudinal edges by roller 22. This not only causes undue wear of the conveyor belt edges, but also wear of roller 22, the conveyor belt edges tending to cut into the roller. This wear can become sufficiently pronounced that the roller 22 must be replaced. Finally, the single, horizontally oriented roller 22 provides little or no tracking control of the lower flight. The conveyor belt 8 is generally made up of segments, including replacement segments. Sometimes, proper alignment of segments is not achieved at the junctures thereof, which will adversely affect the tracking characteristics of the conveyor belt. Sometimes a replacement segment is not exactly the same as the belt in which it is inserted, and this too will adversely affect the tracking characteristics.

It will be understood that the prior art conveyor 1 of FIG. 1 is exemplary only. The construction and nature of the framework 2, the legs 6 and 7 and the mounting means for troughing rollers 10, 11 and 12 and return roller 22, all may differ from one installation to another. The precise construction of these elements, however, does not constitute a limitation of the present invention. For example, in FIG. 1, the arrows A and B illustrate the direction of travel of the upper flight 8a and the lower flight 8b respectively, of the conveyor belt 8. The troughing rollers 10, 11 and 12 are shown in alignment across the conveyor 1. It is a common practice to locate the horizontal roller 10 rearwardly of the upwardly and outwardly sloping rollers 11 and 12 and to align the inner ends of the rollers 11 and 12 with the ends of the horizontal roller 10. This type of construction enables greater roller length and eliminates gaps.

Figure 2:
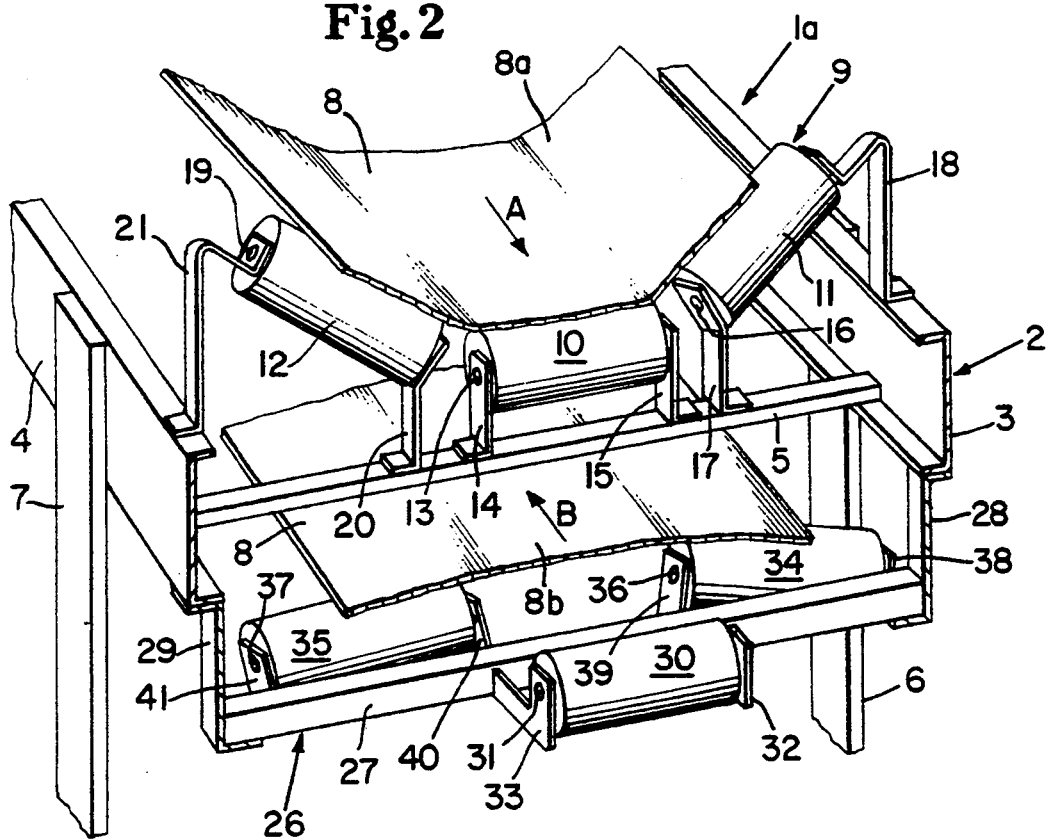
FIG. 2 is a fragmentary perspective view, similar to FIG. 1, and illustrating a bulk conveyor provided with a return roller assembly of the present invention.

Reference is now made to FIG. 2. For purposes of an exemplary showing, FIG. 2 illustrates a conveyor identical to that of FIG. 1 with the exception that it is provided with return roller assemblies of the present invention for support of the return flight of the conveyor belt. In FIG. 2, like parts have been given the same index numerals used in FIG. 1.

FIG. 2 illustrates a return roller assembly of the present invention, generally indicated at 26. It will be understood by one skilled in the art that return roller assemblies of the type shown at 26 will be provided at appropriately spaced intervals along the length of the conveyor to properly support the conveyor belt lower return flight 8b.

The return roller assembly 26 comprises an elongated support 27 mounted on and between a pair of brackets 28 and 29 which are affixed to and which depend downwardly from the conveyor side members 3 and 4. The roller assembly 26 further comprises a central horizontal roller 30 rotatively mounted on a shaft 31 which, in turn, is supported by brackets 32 and 33 extending from one side of elongated support 27. A pair of downwardly and outwardly sloping rollers 34 and 35 are rotatively mounted on shafts 36 and 37, respectively. The shaft 36 of roller 34 is supported by brackets 38 and 39 affixed to elongated support 27. Similarly, the shaft 37 of roller 35 is supported by brackets 40 and 41 affixed to the elongated support 27. It will be noted that brackets 38 and 39 of roller 34 and brackets 40 and 41 of roller 35 extend from the side of elongated support 27 opposite the side from which the brackets 32 and 33 of roller 30 extend. As is apparent from FIG. 2, the central roller 30 is mounted on the upstream side of support 27 and rollers 34 and 35 are mounted on the down stream side of support 27 with regard to the direction of travel B of the conveyor belt lower return flight 8b.

Reference is now made to FIGS. 3, 4 and 5 wherein the return roller assembly 26 is more clearly shown. The elongated support 27 may have any appropriate cross sectional configuration. For example, it may constitute a tubular member of rectangular cross section, an I-beam or a channel member, as shown in FIG. 5.

The rollers 30, 34 and 35 are rotatively mounted on their respective shafts 31, 36 and 37 by appropriate bearing means (not shown). While not so limited, the rollers 30, 34 and 35 are preferably of the same length, and may have a length ranging from about 8 inches to about 28 inches, depending upon the width of the conveyor belt being supported. Depending upon their length, the rollers 30, 34 and 35 may have a diameter ranging from about 4 inches to 6 inches, the diameter increasing as the length increases. The hubs of the rollers may be provided with ⅜ inch tapered roller bearings. The shafts 31, 36 and 37 are fixedly mounted in their respective brackets 32–33, 38–39, and 40–41. As is most clearly shown in FIG. 5, the shaft supporting brackets 32, 33, 38, 39, 40 and 41 are generally L-shaped, one leg of each bracket being welded or otherwise appropriately attached to the elongated support 27. The brackets 32 and 33 are so sized and shaped that the shaft 31 and its roller 30 are horizontal. The brackets 39 and 40, which support the shafts 36 and 37 at the innermost ends of their respective rollers 34 and 35 are so sized and configured that the highest part of the rollers 34 and 35, at the innermost ends thereof, lie at the same vertical level as the highest portion of center roller 30. This is clearly shown in FIGS. 4 and 5. It will further be noted from FIGS. 3 and 4 that the innermost ends of rollers 34 and 35 slightly overlap the ends of horizontal roller 30, as viewed in FIG. 4, such that in the elevational view of FIG. 4, there is no apparent longitudinal gap between rollers 30, 34 and 35. The brackets 38 and 41, supporting the outermost ends of shafts 36 and 37, are so sized and configured that the outermost ends of the rollers 34 and 35 are lower than their innermost ends, resulting in the fact that the rollers 34 and 35 slope downwardly and outwardly with respect to horizontal roller 30. This is clearly seen in all three of FIGS. 3, 4 and 5. The brackets 38, 39, 40 and 41 are welded or otherwise appropriately affixed to that side of elongated support 27 opposite the side to which brackets 32 and 33 are affixed. Furthermore, the brackets 38, 39, 49 and 41 are slightly tilted so as to be substantially perpendicular to the respective one of shafts 36 and 37 they support.

It will be apparent, particularly from FIG. 4, that the return assembly rollers 30, 34 and 35 define a supporting shape for the return flight 8b of the conveyor belt 8, which accommodates the shallow, inverted, trough-shaped set of lower flight 8b. As noted above, the angular arrangement of troughing rollers 10, 11 and 12 imparts a trough-like configuration to the conveyor belt upper flight 8a so that it can more easily convey bulk material. The angular relationship of the return rollers 30, 34 and 35 of the present invention is intended to accommodate the shallow, trough-shaped set of the conveyor belt lower flight 8b. It has been found that the return roller assemblies of the present invention provide markedly improved guidance for the conveyor belt lower flight 8b. This, in turn, results in better tracking of lower flight 8b. In addition, each roller having bearing means at each end, six bearings carry the same load as two bearings in the return roller 22 of FIG. 1. This greatly reduces bearing wear. In addition, shaft deflection characteristic of long rollers is eliminated by the provision of three shorter rollers, also increasing bearing life. Finally, the fact the rollers 30, 34 and 35 are so angular related as to accommodate the set of lower flight 8b, causes the lower flight to be support substantially throughout its lid, rather than primarily at its longitudinal edges. As a consequence, the roller edges do not cut into the rollers 34 and 35, increasing roller life and greatly reducing wear of the conveyor belt at its longitudinal edges.

It has been found that as the angularity of troughing rollers 11 and 12 increases from the horizontal, imparting a deeper trough-like cross sectional configuration to the conveyor belt upper flight 8a, the greater will be the trough-like set in the conveyor belt lower return flight 8b. As a consequence, the greater the angularity of shafts 16 and 19 of troughing rollers 11 and 12, the greater should be the angularity of the shafts 36 and 37 of return rollers 34 and 35. While not necessarily so limited, in most instances the angularity of return roller shafts 36 and 37 will fall within the range of from about 3° to about 6° from the horizontal.

In the embodiment of FIGS. 2 through 5, the center horizontal roller 30 is located behind the end rollers 34 and 35 from the standpoint of the lower flight direction of movement indicated by arrow B. It would be within the scope of the invention to have the rollers 30, 34 and 35 so supported that their shafts are aligned transversely of the conveyor, as are the shafts 13, 16 and 19 of the troughing rollers 10, 11 and 12. However, the arrangement illustrated is preferred because it allows for greater roller length and there is, as viewed in FIG. 4, no gap in the supporting profile defined by rollers 30, 34 and 35.

The brackets 28 and 29 are preferably adjustable with respect to side frames 3 and 4. This enables adjustment of the transverse angular relationship of the roller assembly 26 to the lower return flight 8b.

Reference is now made to FIGS. 6–10 wherein a second embodiment of the return roller assembly of the present invention is illustrated. Referring first to FIGS. 6, 7 and 8, this second embodiment of the return roller assembly is in many respects similar to the embodiment of FIGS. 2–5, and like parts have been given like index numerals. The second embodiment is generally designated at 26a and comprises an elongated support 27a similar to the elongated support 27 of FIGS. 2–5 with certain exceptions. First of all, the ends of the elongated support 27a are not affixed to framework support brackets 28 and 29 (see FIG. 2), but rather are slightly spaced inwardly from these brackets. It will be noted that while the elongated support 27a is slightly shorter than the elongated support 27 of FIGS. 2–5, it again is illustrated as being made of a channel member having a top portion and downwardly depending sides.

One side of the elongated support 27a mounts the brackets 32 and 33 to which the shaft 31 of horizontal roller 30 is affixed. Similarly, the opposite side of elongated support 27a mounts brackets 38 and 39 to which the shaft 36 of end roller 34 is affixed. The same side of the elongated support 27a mounts brackets 40 and 41 to which the shaft 37 of end roller 35 is affixed.

In this embodiment, there is a second elongated support 42. The second elongated support 42 may have any appropriate cross section. For purposes of an exemplary showing, it is illustrated in FIG. 8 as being a channel member, having a top portion and downwardly depending sides, similar to the first elongated support 27a. The second elongated support 42 will have its ends affixed to the downwardly depending brackets 28 and 29 of FIG. 2, in substantially the same way shown in that figure with respect to elongated support 27.

The first elongated support 27a is pivotally mounted to the second elongated support 42. This pivotal mounting is located at the longitudinal centers of elongated supports 27a and 42 and is generally indicated at 43 in FIGS. 6 and 7.

The pivotal mounting 43 is more clearly shown in FIG. 9. A cylindrical stud 44 is welded or otherwise appropriately affixed to the top surface of the second elongated support 42 at the longitudinal and transverse center thereof. A bearing block 45, containing an appropriate bearing diagrammatically indicated at 46, is affixed to the two downwardly depending sides of elongated support 27a, and is adapted to receive the stud 44 to complete the pivotal connection of elongated support 27a to elongated support 42.

Near its ends, the elongated support 27a is provided with stabilizing support roller assemblies to prevent rocking of elongated support 27a about the pivot assembly 43. The stabilizing roller assemblies at each end of elongated support 27a are identical and are generally indicated at 47 and 48 in FIGS. 6 and 8. FIG. 10 illustrates the stabilizing roller assembly 47. Since the stabilizing roller assemblies 47 and 48 are identical, a description of one will suffice for both. A stabilizing roller 48 is rotatively mounted on a shaft 49 and may be provided with appropriate bearing means (not shown). The shaft 49 is affixed to appropriate supports 50 and 51 which depend downwardly from the upper portion of elongated support 27a. It will be understood that the supports 50 and 51 could extend from side-to-side of elongated support 27a. At the position of roller 48, the second elongated support 42 has a support pad 52 welded or otherwise appropriately affixed to its upper surface, at the transverse center thereof. The support pad 52 and support roller 48 are so positioned and sized that the bottom edges of the downwardly depending side walls of elongated support 27a are essentially parallel to the top surface of the second elongated support 42. As indicated above, the support roller assembly 48 is identical to that described with respect to FIG. 10. Engagement of the support pads of the support roller assemblies 47 and 48 by the side walls of elongated support 27a will limit the amount of pivoting of elongated support 27a with respect to the second elongated support 42.

Where tracking problems are encountered with respect to the lower return flight 8b of conveyor belt 8, due to inconsistencies between segments of the belt, or for other reasons well known in the art, the use of a return roller assembly of the type described with respect to FIGS. 6–10 may well be advantageous. Referring to FIG. 6, if the return flight 8b, moving in the direction of arrow B, tends to shift to the right as viewed in FIG. 6, the right end of elongated support 27a will tend to pivot forwardly in the direction of arrow B. This, in turn, will cause the conveyor belt lower flight 8b to begin to shift to the left as viewed in FIG. 6. If the lower flight 8b tends to shift too far to the left, then the left end of elongated support 27a will pivot forwardly in the direction of arrow B, tending to cause the lower flight 8b to shift to the right. This lower flight tracking correction is automatic and requires very little pivoting of the elongated support 27a. In a non-limiting example, the support roller 48 may be capable of moving about ¼ inch in either direction from the center of support pad 52, for a total movement range of about ½ inch.

Herein and in the claims, terms such as "vertical" and "horizontal" are used in conjunction with the drawings for purposes of clarity. It is to be understood by one skilled in the art that while the frame of the conveyor will preferably be maintained transversely horizontal by the use of legs of appropriate length, the frame may slope upwardly or downwardly in a longitudinal direction.

Modifications may be made in the invention without departing from the spirit of it. For example, it would be possible to substitute a single roller having an appropriately crowned profile for the rollers 30, 34 and 35 although the use of rollers 30, 34 and 35 is preferred.

What is claimed:

1. A return roller assembly for the return flight of the continuous belt of a bulk conveyor, said return roller assembly comprising a center roller and a pair of end rollers, said center roller having first and second ends and being mounted on a shaft, means for mounting said shaft of said center roller horizontally, each of said end rollers being shaft mounted and having an inner end and an outer end, means mounting said shafts of said end rollers such that the uppermost portion of the inner ends thereof are at the same vertical level as the uppermost part of said center roller, and the uppermost part of the outer ends of said end rollers are below said vertical level, said center and end rollers defining a shallow, inverted, trough-like supporting shape for said return flight.

2. The return roller assembly claimed in claim 1 wherein said shafts of said end rollers slope downwardly and outwardly at an angle of from about 3° to about 6° to the horizontal.

3. The return roller assembly claimed in claim 1 wherein said center roller is laterally offset with respect to said end rollers.

4. The return roller assembly claimed in claim 1 wherein said return roller assembly has a vertical centerline, means to mount said return roller assembly for pivotal movement about said vertical centerline sufficient to automatically maintain said return flight substantially centered with respect to said return roller assembly.

5. The return roller assembly claimed in claim 1 wherein said center roller is laterally offset with respect to said end rollers, said end rollers sloping downwardly and outwardly at an angle of from about 3° to about 6° to the horizontal, said return roller assembly having a vertical centerline, means for mounting said return roller assembly for pivotal movement about said vertical centerline sufficient to automatically maintain said return flight substantially centered with respect to said return roller assembly.

6. A bulk conveyor comprising an elongated framework, said framework comprising side members joined together at intervals by cross braces, said framework being supported at intervals along its length by appropriate support means, a continuous, driven conveyor belt having an upper flight and a lower return flight, said framework having support means thereon for the upper flight and the lower return flight of said conveyor belt, said support means for said conveyor belt upper flight comprising a plurality of troughing idler roller assemblies mounted at intervals along said framework and transversely thereof, said troughing roller assemblies being oriented to impart to said upper conveyor belt flight a trough-like transverse cross sectional shape, said lower return flight of said conveyor belt having a shallow, inverted, trough-shaped set, said support means for said lower return flight comprising a plurality of return roller assemblies extending transversely of said frame at intervals therealong, each of said return roller assemblies comprising a first end roller, a central roller and a second end roller extending transversely across said conveyor framework, a shaft mounting said center roller, said center roller having first and second ends, means for mounting said center roller shaft horizontally, a shaft mounting each of said end rollers, each end roller having an inner end and an outer end, means mounting said shafts of said end rollers such that the uppermost portion of the inner ends thereof are at the same vertical level as the uppermost part of said center roller, and the uppermost part of the outer ends of said end rollers are below said vertical level, said center and end rollers defining a shallow, inverted trough-like supporting shape for said lower return flight.

7. The return roller assembly claimed in claim 6 wherein said shafts of said end rollers slope downwardly and outwardly at an angle of from about 3° to about 6° to the horizontal.

8. The return roller assembly claimed in claim 6 wherein said center roller is laterally offset with respect to said end rollers.

9. The return roller assembly claimed in claim 6 wherein said return roller assembly has a vertical centerline, means to mount said return roller assembly for pivotal movement about said vertical centerline sufficient to automatically maintain said return flight substantially centered with respect to said return roller assembly.

10. The bulk conveyor claimed in claim 6 wherein each return roller assembly comprises an elongated support extending transversely of said framework and operatively connected thereto, said transverse support having an upstream side and a downstream side with respect to the direction of travel of said lower return flight, bracket means affixed to said upstream side of said transverse support and mounting said shaft of said center roller, additional bracket means affixed to said downstream side of said transverse support and mounting said shafts of said end rollers.

11. The return roller assembly claimed in claim 10 wherein said shafts of said end rollers slope downwardly and outwardly at an angle of from about 3° to about 6° to the horizontal.

12. The bulk conveyor claimed in claim 6 wherein each return roller assembly comprises a first elongated support extending transversely of said framework and operatively connected thereto, said first elongated support having an upper surface, a second elongated support having longitudinal sides and having ends unattached to said framework, said second elongated support overlying said first elongated support, said second elongated support being pivotally attached at its longitudinal center to the longitudinal center of said first support, means to prevent rocking of said second longitudinal support at said pivotal attachment, means to limit the pivotal shifting of said ends of said second elongated support to about ¼ inch in either direction from alignment with said first elongated support, one of said longitudinal sides of said second elongated support being an upstream side and the other of said longitudinal sides of said second elongated support being a downstream side with respect to the direction of travel of said lower return flight, bracket means affixed to said upstream side of said second elongated support and mounting said shaft of said center roller, additional bracket means affixed to said downstream side of said transverse support and mounting said shafts of said end rollers.

13. The bulk conveyor claimed in claim 12 wherein said shafts of said end rollers slope downwardly and outwardly at an angle of from about 3° to about 6° to the horizontal.

14. The bulk conveyor claimed in claim 13 wherein said second elongated support is of channel-shaped cross section having a horizontal top from which said longitudinal sides depend, said first elongated support having a horizontal top, a pivot pin extending vertically from the longitudinal center of said top, bearing means mounted within said second elongated support between said longitudinal walls thereof and at the longitudinal center thereof to receive said pivot pin and for said pivotal attachment, an internal roller mounted between said longitudinal walls of said second support adjacent each end thereof, each internal roller having a shaft, means to support said shafts parallel to and equally spaced between said longitudinal walls, said top surface of said first support having an upstanding member beneath each of said internal rollers providing a surface to be engaged thereby, said upstanding members cooperating with said longitudinal walls of said second elongated support to limit said pivotal shifting of said ends of said second elongated support.

* * * * *